(12) United States Patent
Liu

(10) Patent No.: US 9,579,820 B2
(45) Date of Patent: Feb. 28, 2017

(54) SOLAR AUTOCLAVE EQUIPMENT

(71) Applicant: Kai Liu, Shandong (CN)

(72) Inventor: Kai Liu, Shandong (CN)

( * ) Notice: Subject to any disclaimer, the term of this patent is extended or adjusted under 35 U.S.C. 154(b) by 220 days.

(21) Appl. No.: 14/414,634

(22) PCT Filed: Nov. 2, 2014

(86) PCT No.: PCT/CN2014/071954
§ 371 (c)(1),
(2) Date: Jan. 13, 2015

(87) PCT Pub. No.: WO2015/120570
PCT Pub. Date: Aug. 20, 2015

(65) Prior Publication Data
US 2016/0271832 A1   Sep. 22, 2016

(51) Int. Cl.
*F26B 3/04* (2006.01)
*B28B 11/24* (2006.01)
(Continued)

(52) U.S. Cl.
CPC .......... *B28B 11/245* (2013.01); *B01J 3/04* (2013.01); *F24J 2/05* (2013.01); *F26B 3/04* (2013.01); *Y02P 80/24* (2015.11)

(58) Field of Classification Search
CPC ...... F26B 3/00; F26B 3/04; F26B 5/00; B28B 11/00; B28B 11/245; C04B 11/00; C04B 11/032
(Continued)

(56) References Cited

U.S. PATENT DOCUMENTS 1,979,704 A * 11/1934 Randel ................ C04B 11/032
423/159
5,041,333 A * 8/1991 Conroy .................... B28B 1/52
106/711
(Continued)

FOREIGN PATENT DOCUMENTS

AU          2014284257 A1 *  8/2015  ............... B01J 3/04

*Primary Examiner* — Stephen M Gravini
(74) *Attorney, Agent, or Firm* — Kile Park Reed & Houtteman LLC

(57) ABSTRACT

The present invention discloses novel solar autoclave equipment, which comprises an autoclave and a steam providing device, wherein said steam providing device is a solar heating device and comprises a plurality of vacuum tubes which are fixedly arranged outdoors and a connecting tube, a tubular water tank is installed in each said vacuum tube in an insertion manner, each said tubular water tank is in the shape of a straight tube with a closed lower end and an open upper end, the upper end of each said tubular water tank stretches out of said corresponding vacuum tube and is communicated with said connecting tube, and a space between the outer surface of the upper end of said tubular water tank and the inner wall of the upper end of said corresponding vacuum tube is sealed; and an inlet of said connecting tube is connected with a condensate water drain outlet of said autoclave, and an outlet of said connecting tube is connected to a steam input port of said autoclave through a compressor. The present invention uses the compressor to depressurize the solar heating device to obtain steam, the steam is pumped into the autoclave and condensed to release heat to provide corresponding temperature and pressure to the autoclave, and thus the solar heating device can be applied on autoclave equipment.

11 Claims, 2 Drawing Sheets

(51) Int. Cl.
*B01J 3/04* (2006.01)
*F24J 2/05* (2006.01)

(58) Field of Classification Search
USPC .............. 34/60, 80, 90, 282; 423/159, 555; 106/772, 780
See application file for complete search history.

(56) References Cited

U.S. PATENT DOCUMENTS

| | | | | |
|---|---|---|---|---|
| 5,320,677 A * | 6/1994 | Baig | ..................... | C04B 11/024 106/772 |
| 5,784,805 A * | 7/1998 | Hashimoto | .......... | B27K 3/0271 34/202 |
| 5,915,811 A * | 6/1999 | DeVore | ................... | F26B 3/286 34/212 |
| 6,233,841 B1 * | 5/2001 | Beach | ....................... | A23L 3/54 34/203 |
| 6,912,800 B2 * | 7/2005 | Vetter | ................... | A61L 2/0011 34/209 |
| 7,610,692 B2 * | 11/2009 | Carin | ................... | F26B 23/022 34/388 |
| 7,624,514 B2 * | 12/2009 | Konabe | ................... | F26B 3/205 34/86 |
| 7,951,352 B2 * | 5/2011 | Jager | ..................... | C04B 11/032 106/772 |
| 8,266,819 B2 * | 9/2012 | Zillmer | ................ | B01D 53/261 126/609 |
| 8,407,914 B2 * | 4/2013 | Hollinger | ................ | D06F 58/10 223/85 |
| 8,832,962 B2 * | 9/2014 | Pardo | ................... | F26B 23/002 110/224 |
| 8,869,420 B1 * | 10/2014 | Nazhad | ................... | F26B 21/08 110/342 |
| 8,997,376 B2 * | 4/2015 | Carnegie | ................ | F26B 17/14 201/29 |
| 2008/0263890 A1 * | 10/2008 | Picard | ..................... | B30B 15/34 34/282 |
| 2016/0271832 A1 * | 9/2016 | Liu | ........................... | F26B 3/04 |

\* cited by examiner

SOLAR AUTOCLAVE EQUIPMENT

FIELD OF THE INVENTION

The present invention relates to autoclave equipment, in particular to novel solar autoclave equipment.

BACKGROUND OF THE INVENTION

The application of autoclave equipment is very wide, such as autoclave curing of building materials such as aerated concrete blocks, coal ash bricks, microporous calcium silicate boards, novel light wall body materials, heat insulating asbestos boards and high-strength gypsum. Moreover, the autoclave equipment is also widely applied to rubber product and wood drying and anticorrosion treatment, heavy metal smelting, chemical fiber high-pressure treatment, cable vulcanization, and production projects which need pressure autoclave curing in chemical industry, pharmaceutical industry, aerospace industry, heat insulating material industry, textile industry, military industry, etc.

The autoclave equipment mainly consists of several parts such as an autoclave, a steam providing device and a safety control device. By taking the autoclave curing of the aerated concrete blocks as an example, the aerated concrete blocks are placed in the autoclave, the steam providing device provides high temperature and high pressure steam to the autoclave, the aerated concrete blocks finish $CaO$—$SiO_2$—$H_2O$ hydrothermal reaction in the autoclave to complete the autoclave curing. At present, the steam providing device mainly adopts a boiler boiling method to provide high temperature and high pressure steam, i.e., water is heated to obtain expanded water steam, so as to provide the autoclave with the steam and pressure. Since the water expansion and pressurization process needs to consume a great amount of energy, the energy consumption of the steam providing device of the existing autoclave equipment during working is huge.

As everyone knows, nowadays the energy crisis has already become a significant problem which hinders the development of global economy. Clean renewable energy such as solar energy is an important means to solve the energy crisis. However, since the efficiency of realizing water expansion and pressurization of solar equipment is very low, the solar equipment cannot be applied to the autoclave equipment.

SUMMARY OF THE INVENTION

The technical problem to be solved by the present invention is a problem that the autoclave equipment cannot utilize solar energy to provide high temperature and high pressure steam.

In order to solve the above-mentioned technical problem, the technical solution adopted by the present invention is to provide novel solar autoclave equipment, which comprises an autoclave and a steam providing device, wherein said steam providing device is a solar heating device and comprises
a plurality of vacuum tubes which are fixedly arranged outdoors, wherein a tubular water tank is installed in each said vacuum tube in an insertion manner, each said tubular water tank is in the shape of a straight tube with a closed lower end and an open upper end, the upper end of each said tubular water tank stretches out of said corresponding vacuum tube, and a space between the outer surface of the upper end of said tubular water tank and the inner wall of the upper end of said corresponding vacuum tube is sealed; and a connecting tube, wherein the upper end of each tubular water tank is communicated with said connecting tube, an inlet of said connecting tube is connected with a condensate water drain outlet of said autoclave and an outlet of said connecting tube is connected to a steam input port of said autoclave through a compressor.

In the above-mentioned solution, said plurality of vacuum tubes are arranged in a row.

In the above-mentioned solution, said plurality of vacuum tubes are arranged in a plurality of rows and are configured in an array, and connecting tubes connected with said tubular water tanks in each row are sequentially connected in a head-to-tail manner to form a serial structure or are connected to form a reticular structure.

In the above-mentioned solution, said vacuum tubes are vertically or obliquely arranged.

In the above-mentioned solution, a reversing valve is arranged at the inlet of said compressor, a first inlet of said reversing valve is connected with the outlet of said connecting tube through a first pipeline, and a second inlet of said reversing valve is connected to the atmosphere.

In the above-mentioned solution, an outlet of said compressor is connected with the steam input port of said autoclave through a second pipeline, and a first flow control valve is arranged on said second pipeline.

In the above-mentioned solution, said condensate water drain outlet is connected to a water tank through a third pipeline, the bottom of said water tank is provided with a sewage drain pipe, and the inlet of said connecting tube is connected to the upper part of said water tank through a fourth pipeline.

In the above-mentioned solution, a safety valve is arranged on said autoclave and used for controlling the maximum internal pressure of said autoclave.

The present invention uses the compressor to depressurize the solar heating device to obtain steam, the steam is pumped into the autoclave and is condensed to release heat to provide corresponding temperature and pressure to the autoclave, and thus the solar heating device can be applied on autoclave equipment; and besides, the solar heating device adopts the tubular water tanks which are respectively installed in the plurality of vacuum tubes in an insertion manner to collect, water in each tubular water tank is heated, does not flow away and just exchanges heat with water, and thus the normal working of the solar autoclave equipment is guaranteed.

DESCRIPTION OF THE EMBODIMENTS

The present invention is further described below in details in conjunction with specific embodiments and the drawings.

Figure 1:
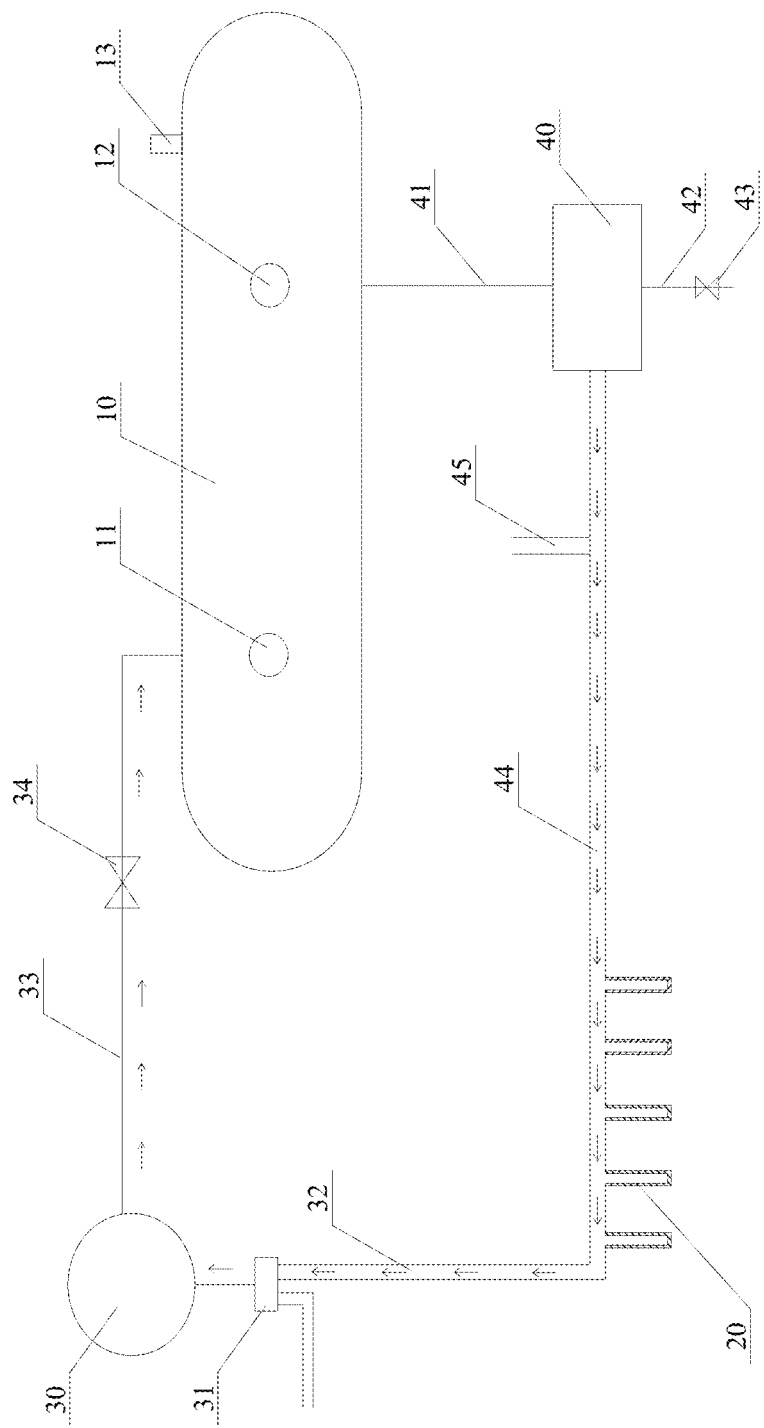
FIG. 1 is a structural schematic view of the present invention.

As shown in FIG. 1, novel solar autoclave equipment provided by the present invention comprises an autoclave 10 and a steam providing device 20, wherein the autoclave 10 is used for conducting autoclave curing to materials such as aerated concrete blocks, the steam providing device 20 is used for providing high temperature and high pressure steam to the autoclave 10, and the steam providing device 20 is a solar heating device.

Figure 2:
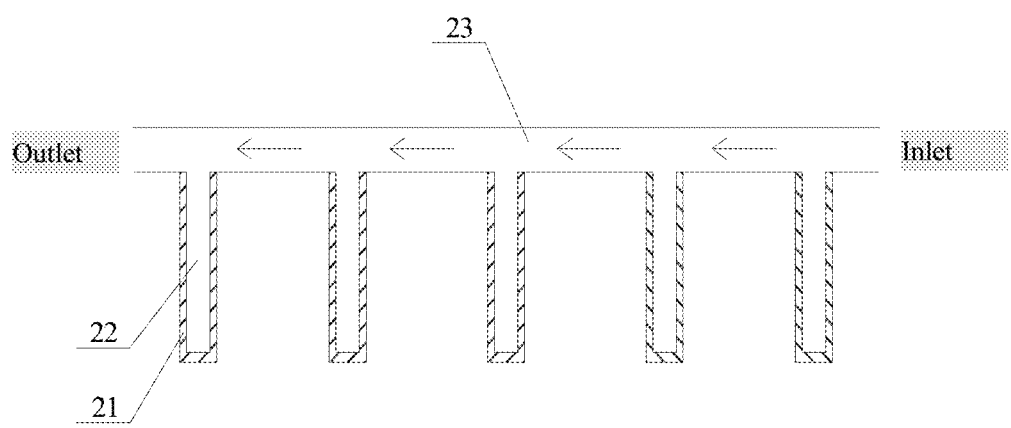
FIG. 2 is a structural schematic view of a steam providing device in the present invention.

As shown in FIG. 2, the solar heating device comprises a plurality of vacuum tubes 21, the vacuum tubes 21 are vertically arranged and are fixedly arranged outdoors, and the number of the vacuum tubes 21 is generally determined according to actual needs.

A tubular water tank 22 is installed in each vacuum tube 21 in an insertion manner, each tubular water tank 22 is in the shape of a straight tube with a closed lower end and an open upper end, the upper end of each tubular water tank 22 stretches out of the corresponding vacuum tube 21, a space between the outer surface of the upper end of each tubular water tank 22 and the inner wall of the upper end of the corresponding vacuum tube 21 is sealed, the plurality of vacuum tubes are arranged in a row or arranged in a plurality of rows in an array, the upper ends of the tubular water tanks 22 in each row are respectively communicated through one connecting tube 23 to form a parallel connected structure, connecting tubes 23 connected with the tubular water tanks 22 in each row are sequentially connected in a head-to-tail manner to form a serial structure or are connected to form a reticular structure, and finally a connecting tube header with an inlet ad an outlet is formed.

In the embodiment, the tubular water tanks 22 are made of stainless steel, copper or alloy materials. After each tubular water tank 22 is inserted into the corresponding vacuum tube 21, the outer surface of the tubular water tank 22 is close to the inner wall of the vacuum tube 21, at least one of the vacuum tube 21 and the tubular water tank 22 is coated with a solar energy selective absorbing coating layer, and thus solar energy is absorbed and converted into heat energy to heat the water in each tubular water tank 22. If both the vacuum tubes 21 and the tubular water tanks 22 are coated with the solar energy selective absorbing coating layer, the utilization ratio of the solar energy can be further increased.

Then referring to FIG. 1, the inlet of the connecting tube 23 is connected with a condensate water drain outlet of the autoclave 10, and the outlet of the connecting tube 23 is connected to a steam input port of the autoclave 10 through a compressor 30.

A reversing valve 31 is arranged at the inlet of the compressor 30, a first inlet of the reversing valve 31 is connected with the outlet of the connecting tube 23 through a first pipeline 32, and a second inlet of the reversing valve 31 is connected to the atmosphere.

An outlet of the compressor 30 is connected with the steam input port of the autoclave 10 through a second pipeline 33, and a first flow control valve 34 is arranged on the second pipeline 33.

The condensate water drain outlet of the autoclave 10 is connected to a water tank 40 through a third pipeline 41, the bottom of the water tank 40 is provided with a sewage drain pipe, and the inlet of the connecting tube 23 is connected to the upper part of the water tank 40 through a fourth pipeline 42.

A safety valve 13 is arranged on the autoclave 10 and used for controlling the maximum internal pressure of the autoclave 10.

The present invention is further provided with a water replenishing pipe 45 for replenishing water consumed and lost during the operation of the equipment, and the water replenishing pipe 45 can be arranged on the connecting tube 23 or the water tank 40.

The working process of the present invention is as follows:

The vacuum tubes 21 absorb the solar energy to heat the water in the tubular water tanks 22, the compressor 30 works to enable the internal part of the steam providing device to become into a negative-pressure state, thus hot water in the connecting tube 23 quickly becomes into steam which is pumped into the autoclave 10, the steam participates in reaction in the autoclave 10 and is condensed to release heat to conduct autoclave curing to materials such as aerated concrete blocks, and heat-containing condensate water backflows through the connecting tube 23 to continuously participate in circulation to continuously release heat. Since the condensate water carries a great amount of heat, the amount of energy needed for regenerating steam is smaller and the energy utilization ratio is high.

In the present invention, the working manner of the solar heating device is different from the traditional solar heating manner. The traditional solar heating manner usually adopts U-shaped tubes and water flows and is heated in the U-shaped tubes. However, in the present invention, the water does not flow in the tubular water tanks 22, thus the water is continuously heated. Moreover, since the internal part of the solar heating device is in the negative-pressure state, the heat thereof is absorbed in the water evaporation process and is taken away in the form of steam, which is pumped into the autoclave 10 and is condensed to release heat.

In addition, the present invention provides a complete protection device, which is specifically described as follows: (1) when the internal temperature of the autoclave 10 is lower than a set value, the reversing valve 31 is switched to be communicated with the steam providing device 20, steam in the connecting tube 23 continuously enters the autoclave 10 and thus the internal temperature of the autoclave 10 is continuously increased;

(2) when the internal temperature of the autoclave 10 is higher than the set value, the reversing valve 31 is switched to be communicated with the atmosphere, the compressor 30 inputs air into the autoclave 10 and does not input the steam any more, and thus the internal temperature of the autoclave 10 is not continuously increased any longer;

(3) when the internal pressure of the autoclave 10 is lower than a set value, the opening of the flow control valve 34 is increased, the air inlet amount of the autoclave 10 is increased and thus the internal pressure of the autoclave 10 is increased; and (4) when the internal pressure of the autoclave 10 is higher than the set value, the opening of the flow control valve 34 is decreased, the air inlet amount of the autoclave 10 is decreased and thus the internal pressure of the autoclave 10 is decreased.

The above-mentioned reversing valve 31 and the flow control valve 34 are automatically controlled through a control unit, i.e., a temperature sensor 11 and a pressure sensor 12 continuously transmit the internal temperature and the internal pressure of the autoclave 10 to the control unit, and the control unit outputs corresponding control signals to the reversing valve 31 and the flow control valve 34 according to the internal temperature and the internal pressure of the autoclave 10.

A pressure reducing valve 13 is further arranged on the autoclave 10. When the internal pressure of the autoclave 10 is accidently and instantaneously increased, the pressure reducing valve 13 is automatically opened to exhaust the steam in the autoclave 10 to guarantee the safe operation of the autoclave 10.

In addition, the pressure reducing valve 13 can also be automatically controlled through the control unit. When the internal temperature or the internal pressure of the autoclave 10 always exceeds the set value within a period of time (such as 2 minutes, which can be set by a user according to actual needs), the control unit gives out a control signal, the pressure reducing valve 13 is opened to exhaust the gaseous steam in the autoclave 10, thus the goal of reducing the internal temperature or the internal pressure of the autoclave 10 is achieved and the safe operation of the autoclave 10 is further guaranteed.

Compared with the existing technical solution, the technical solution provided by the present invention solves numerous problems which cannot be solved in the prior art, and has the following prominent advantages:

(1) The precedent of utilizing the internal environment of a heat pump system is creatively started by the present invention, the internal part of the autoclave is used as a condensing section of the heat pump system, and the temperature and pressure needed by the autoclave are obtained in the internal environment of the heat pump system. In the process, working medium (water/water steam) in the internal environment of the heat pump system is in direct contact with substances (products) to be acted, heat is transferred or chemical reaction happens and thus the efficiency is greatly improved.

(2) The present invention provides a method for obtaining steam and application in the autoclave field. The existing boiler boiling method adopts a process of heating water to obtain expanded water steam to provide the autoclave with steam and pressure, and the expansion and pressurization process consumes a great amount of energy. However, the present invention uses the compressor to depressurize the low temperature water source to obtain steam, which is then pumped into the autoclave and is condensed to release heat to obtain corresponding temperature and pressure. Since the solar energy is utilized to provide needed steam and pressure to the autoclave system, the energy is saved.

(3) A great amount of fossil fuel and electric power needs to be consumed in order to increase the pressure in the traditional boiler boiling method. However, in the solution provided by the present invention, corresponding pressure can be obtained at the same time when cyclic heat supply is realized and additional work is not necessarily done.

(4) Since the water in the tubular water tanks basically does not flow, the water is always heated by the vacuum tubes and the vacuum tubes are equivalent to a heat preserving container with a quite good effect, the loss of heat is reduced.

(5) In the existing autoclave method, fossil energy is directly or indirectly consumed and thus great pollution is caused. However, in the solution provided by the present invention, by using the solar heat energy, no pollution is caused during operation.

The present invention is not limited to the above-mentioned preferable embodiments. It shall be known to any one that, all technical solutions which are identical with or similar to the technical solution of the present invention and are obtained by making structural variations under the inspiration of the present invention, should fall into the protection scope of the present invention.

What is claimed is:

1. A novel solar autoclave equipment, comprising an autoclave and a steam providing device, and characterized in that said steam providing device is a solar heating device and comprises:

a plurality of vacuum tubes which are fixedly arranged outdoors, wherein a tubular water tank is installed in each said vacuum tube in an insertion manner, each said tubular water tank is in the shape of a straight tube with a closed lower end and an open upper end, the upper end of each said tubular water tank stretches out of said corresponding vacuum tube, and a space between the outer surface of the upper end of said tubular water tank and the inner wall of the upper end of said corresponding vacuum tube is sealed; and a connecting tube, wherein the upper end of each tubular water tank is communicated with said connecting tube, an inlet of said connecting tube is connected with a condensate water drain outlet of said autoclave and an outlet of said connecting tube is connected to a steam input port of said autoclave through a compressor.

2. The novel solar autoclave equipment according to claim 1, characterized in that said plurality of vacuum tubes are arranged in a row.

3. The novel solar autoclave equipment according to claim 1, characterized in that said plurality of vacuum tubes are arranged in a plurality of rows and configured in an array, and connecting tubes connected with said tubular water tanks in each row are sequentially connected in a head-to-tail manner to form a serial structure or are connected to form a reticular structure.

4. The novel solar autoclave equipment according to claim 1, characterized in that said vacuum tubes are vertically or obliquely arranged.

5. The novel solar autoclave equipment according to claim 1, characterized in that a reversing valve is arranged at the inlet of said compressor, a first inlet of said reversing valve is connected with the outlet of said connecting tube through a first pipeline, and a second inlet of said reversing valve is connected to the atmosphere.

6. The novel solar autoclave equipment according to claim 1, characterized in that an outlet of said compressor is connected with the steam input port of said autoclave through a second pipeline, and a first flow control valve is arranged on said second pipeline.

7. The novel solar autoclave equipment according to claim 1, characterized in that said condensate water drain outlet is connected to a water tank through a third pipeline, the bottom of said water tank is provided with a sewage drain pipe, and the inlet of said connecting tube is connected to the upper part of said water tank through a fourth pipeline.

8. The novel solar autoclave equipment according to claim 1, characterized in that a safety valve is arranged on said autoclave and used for controlling the maximum internal pressure of said autoclave.

9. The novel solar autoclave equipment according to claim 1, characterized in that the novel solar autoclave equipment further comprises a water replenishing pipe, which is used for replenishing water into said tubular water tanks.

10. The novel solar autoclave equipment according to claim 2, characterized in that said vacuum tubes are vertically or obliquely arranged.

11. The novel solar autoclave equipment according to claim 3, characterized in that said vacuum tubes are vertically or obliquely arranged.

* * * * *